US012703092B2

(12) United States Patent
Zamora Esquivel et al.

(10) Patent No.: US 12,703,092 B2
(45) Date of Patent: Aug. 11, 2026

(54) TOOL POSITION DETERMINATION IN A ROBOTIC APPENDAGE

(71) Applicant: Intel Corporation, Santa Clara, CA (US)

(72) Inventors: Julio Zamora Esquivel, Zapopan (MX); Leobardo Campos Macias, Guadalajara (MX); Edgar Macias Garcia, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/957,463

(22) Filed: Sep. 30, 2022

(65) Prior Publication Data

US 2023/0033821 A1 Feb. 2, 2023

(51) Int. Cl.
*G05D 1/02* (2020.01)
*B25J 9/16* (2006.01)

(52) U.S. Cl.
CPC .................................. *B25J 9/1664* (2013.01)

(58) Field of Classification Search
CPC .... G05D 1/248; G05D 1/2295; G05D 1/2246; G05D 1/0214; G05D 1/617; G05D 2109/10; G05D 2105/15; G05D 2107/23; B25J 9/1664
See application file for complete search history.

(56) References Cited

PUBLICATIONS

Wilde et al., A robotic camera arm for increased situational awareness in telepresent on-orbit servicing, 2010, IEEE, p. 1-11 (Year: 2010).*
Hirano et al., Vibration suppression control of a space robot with flexible appendage based on simple dynamic model, 2013, IEEE, p. 789-794 (Year: 2013).*
Šumanas et al., Determination of Excavator Tool Position using Absolute Sensors, 2021, IEEE, p. 1-5 (Year: 2021).*
Jiang et al., An open-source control software to the virtual submerged floating operational system (VSFOS), 2016, IEEE, pg., 1-6 ( Year: 2016).*
Andreff, N., "Robot hand-eye calibration using structure-from-motion", Int. J. Robot. Res., vol. 20(3), (2001), 228-248.
Bayro, E., "Differential and inverse kinematics of robot devices using conformal geometric algebra", Robotica, vol. 25(1) pp. 43-91, (2007), 19 pgs.
Heller, J., "Structure-from-Motion Based Hand-Eye Calibration Using L8 Minimization", In Proc. IEEE Cont. Comput. Vis. Pattern Recognit. (CVPR), vol. 1(1), (2011), 3497-3503.
Lu, X. X., "A review of solutions for perspective-n-point problem in camera pose estimation", In Journal of Physics: Conference Series. vol. 1087(5), pp. 052009, (2018), 9 pgs.
(Continued)

*Primary Examiner* — McDieunel Marc
(74) *Attorney, Agent, or Firm* — Banner & Witcoff, Ltd.

(57) ABSTRACT

System and techniques for tool position determination in a robotic appendage are described herein. A robotic appendage is put through a rotational movement to induce acceleration in a tool mounted to the appendage. A model for acceleration is created from positional kinematics of the appendage. A measurement of acceleration is taken at the tool and fit to the model to determine distance from the axis of rotation to the tool. The distance is provided for use in control or modeling of the robotic appendage.

25 Claims, 5 Drawing Sheets

(56) References Cited

PUBLICATIONS

Pachtrachai, K., "Hand-eye calibration for robotic assisted minimally invasive surgery without a calibration object", International Conference on Intelligent Robots and systems (IROS), (2016), 2485-2491.

Zhou, B., "An efficient solution to the perspective n-point problem for camera with unknown focal length", IEEE Access, vol. 8(1), (2020), 162838-162846.

* cited by examiner

TOOL POSITION DETERMINATION IN A ROBOTIC APPENDAGE

TECHNICAL FIELD

Embodiments described herein generally relate to robotic manipulator controllers and more specifically to tool position determination in a robotic appendage.

BACKGROUND

Robots are autonomous or semi-autonomous machines. A typical example of a robot is an appendage, such as an arm, without one or more support portions connected by joints with varying degrees of movement. Often, a tool, such as a welder or manipulator are at the end of the appendage. A controller, using software, hardware, or both, controls actuators of the robot, such as motors or hydraulic cylinders, to control the appendage and perform a task.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
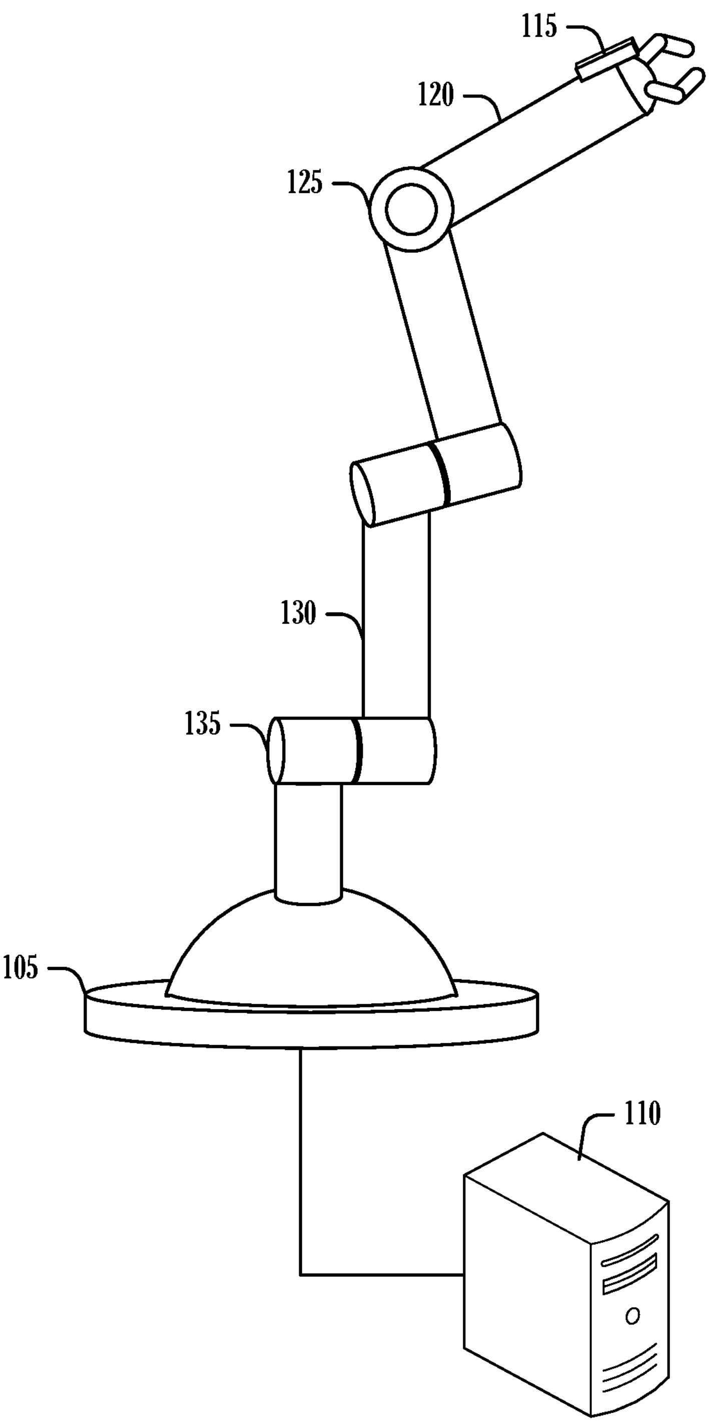
FIG. 1 is an example of an environment including a system for tool position determination in a robotic appendage, according to an embodiment.

Robotic systems are often calibrated such that given actuator input results in a known position of the robot. Thus, using accurate stepper motors, a programmer may designate X steps to put the end of a robotic arm over a target. There is an advantage of simplicity in programming and hardware elements in such an approach, but it is often difficult to achieve such precise calibration. This difficulty may result in increased production or operating costs, including frequent re-calibrations as elements of the hardware wear.

To address this problem, automatic calibration techniques may be employed. To simplify the following discussions, the calibration discussed is for a tool at the end of a robotic arm. However, the same techniques may be equally applied to other appendages, such as a foot on a robotic leg. Consider a camera (e.g., the tool) mounted on the end of the arm. Often, the first challenge encountered during manipulator-camera calibration is the estimation of the pose (e.g., orientation) of the camera relative to the world. Often, the manipulator pose may be acquired from the robot forward kinematic chain. Depending on the technique used to estimate the camera pose, the manipulator-camera calibration may be regarded as a target-based or targetless approach.

In a target-based approach, physical objects with measured distances or dimensions (e.g., "calibration objects") are used. Here, an estimation of the following homogeneous transformation is made:

$$A_{c_2}^{c1} X_h^c = X_h^c B_{h_2}^{h1}$$

where A and B are the relative motion homogeneous matrices of the camera and the manipulator, and X is the homogeneous transformation between two reference frames. The camera pose is estimated by observing a set of three-dimensional (3D) points provided by a calibration object and their corresponding two-dimensional (2D) representations acquired from the camera. Once the relative motions are calculated, the end-effector (e.g., manipulator) position may be calculated using a forward-kinematic model. The homogeneous matrix may be found through various optimization algorithms.

In the targetless-based approach, only the information acquired from sensors, with no measured distances, is used. An example of such an approach is structure from motion. Structure from motion employs the same approach as the target approach, but the motions from the camera are estimated by detecting and tracking a set of features through different camera frames, avoiding the use of calibration objects. The features are simply recognizable elements—such as high contrast pixels—that are identifiable in both camera frames when the camera is moving.

Tool motion tracking is a calibration variation where an exact computer aided design (CAD) model, or the like, is used to estimate the forward kinematics of the robot articulation with an external tool e.g., an end-effector), while the structure from motion is used to calculate the camera motions looking at the end-effector. Then, a transformation between both reference frames may be iteratively calculated.

There are several issues with these calibration techniques. For example, some require a visual pattern—such as a checkboard pattern—from which to orient the camera. Further, computer vision algorithms are needed to determine locations of the visual pattern—such as corners in the checkboard pattern—and determining the relative position of the pattern to the robot.

To address these issues, a technique to determine tool distance from rotational axes of a robotic appendage based on a predicted acceleration given rotational position inputs and a measured acceleration of the tool. That is, a rotational element (e.g., joint) of the appendage is actuated over a set range of rotation. A model of acceleration for a tool mounted at the end of the rotating portion of the appendage is generated for a variety of distances from the axis of rotation. A sensor on the tool, such as an accelerometer, tracks actual acceleration of the tool during the rotational movement. Then, a correlation between the modeled and the measured acceleration is found by minimizing variance between the two. This correlation will result in an estimation of the distance of the tool from the axis of acceleration.

The acceleration model and measure technique provides several advantages over previous calibration methods. For example, the technique may be performed at any time, while the robot is operating, providing an efficient and on-going calibration. The technique does not use visual data, and thus no camera is needed. Rather, only an ability to measure acceleration at the tool is used. Thus, this technique may be called a blind technique. In an example, an accelerometer can be affixed to the tool when needed and removed when not needed. Refraining from using the camera also avoids a variety of complications cameras may introduce, such as varying resolutions, lenses, or other camera calibration information. Moreover, when compared to the target-based calibration, both the target and the need for a human to participate in setting up the target are eliminated. Additional details and examples are provided below.

FIG. 1 is an example of an environment including a system for tool position determination in a robotic appendage 105, according to an embodiment. The illustrated system includes a controller 110 that includes memory, processing circuitry, and an interface to instructs the various actuators in the robotic appendage 105.

The robotic appendage 105 is illustrated with several joints and shafts representing portions of the robotic appendage 105. Thus, a first portion 120 includes a support member (for the manipulator tool at the end of the robotic appendage 105) and a rotating member 125. Similarly, a second portion 130 includes a support member a rotating member 125. Mounted on the tool is an inertial measurement unit (IMU) 115 or the like to measure acceleration of the tool. The tool may be any element affixable to the robotic appendage 105, such as a camera, a gripper, a welder, a pump, a siphon, a light, etc.

To perform the calibration, the controller 110 is configured to perform a rotational movement of any portion of the robotic appendage 105. Here, the rotational movement is defined by rotational positions about an axis. Consider that the rotating member rotates within a single axis. The rotational movement is simply an instruction from the controller 110 to the rotating member 125 to move along that axis. In an example, the robotic appendage includes multiple portions (as illustrated). In an example, each portion of the multiple portions is defined by a respective rotating member and a respective support member. This definition enables the correlation between positional rotation and acceleration regardless of the shape or in which plane the rotational member rotates. In each case, a straight line distance between the axis of rotation and the tool can be determined as noted below.

In an example, the rotational positions cover less than a complete revolution about the axis. In an example, the rotational positions cover a quarter or a third of the complete revolution about the axis. This restriction on the rotation does not affect the accuracy of the calibration and permits calibration in places or hardware configurations in which full rotation about the axis is not possible or impractical. In an example, the rotational movement repeats the rotational positions multiple times. In an example, the repetition of the rotational positions is divided into equal time periods. These examples, when in-complete rotation is used, cause the rotating member 125 to move back and forth over an arc of the axis. The repeated motion may enable more precise fitting of observed and modeled acceleration to determine the distance between the axis of rotation and the tool (or more precisely the IMU 115).

In an example, multiple portions other than the portion are placed into a predefined position for the acceleration measurement from the IMU 115 (e.g., sensor) affixed to the tool. This example addresses the possibility that multiple of the rotating members may be manipulated to counteract the natural acceleration of the IMU 115 during rotation. For example, if the rotating member 135 counteracted the rotational movement of rotating member 125, the IMU 115 would not move and thus would not measure the acceleration. Accordingly, a predefined relationship of the rotating members is established while the rotating member 125 is rotated.

In an example, additional respective rotational movements are performed for the multiple portions to determine a distance between the tool and respective rotating members of the multiple portions. Here, the process for the first rotating member 125 is repeated for the remaining rotating members. This enables distance measurements from the IMU 115 (and thus the tool) and each axis of the various rotating members.

The controller 110 is configured to create a model of tool acceleration for a tool along the rotational movement. In an example, creating the model of the tool acceleration includes creating a kinematic model of tool positioning based on the rotational movement. The kinematic model is based on known inputs (e.g., rotational position of the first rotating member) and produces an expected position of the portion of the robotic appendage 105. In an example, creating the model of the tool acceleration includes deriving tool acceleration from the kinematic model to create a differential kinematic model of tool acceleration. This element enables the fitting of acceleration data from the IMU 115 to the model. In general, this results in an elegant solution because establishing the position of the tool is difficult—often requiring cameras or other equipment—while the IMU 115 is a readily available sensor that is often already a part of the tool. There is a discussion of the kinematic model and differential kinematic model below in relation to FIG. 3.

The controller 110 is configured to obtain (e.g., retrieve or receive) acceleration measurements from a sensor (e.g., the IMU 115) affixed to the tool. Here, the acceleration measurements are taken during the rotational movement. In an example, the acceleration measurements include acceleration in multiple axes. The multiple axes, or rather the apportionment of acceleration between the multiple axes, may be used to determine a pose (e.g., orientation) of the tool with respect to the robotic appendage. Accordingly, if the tool is a camera mounted at a forty-five degree angle above a gripper, then a rotational movement entirely in the x axis may result in equal acceleration in both the x and y axes due to the orientation of the camera.

The controller 110 is configured to determine a distance from the axis to the tool based on the model of tool acceleration and the acceleration measurements. Essentially, the model illustrates examples of acceleration that can be expected at various distances. The measured acceleration is fit to the model by solving for the distance, resulting in determination of the distance. In an example, determining the distance from the axis to the tool based on the model of tool acceleration and the acceleration measurements includes minimizing error between the acceleration measurements and the model of tool acceleration. In an example, an orientation of the tool with respect to the portion of the robotic appendage is determined based on the model of tool acceleration and the acceleration measurements. In an example, where the acceleration measurements include acceleration in multiple axes, the orientation of the tool is determined based on apportionment of tool acceleration between at least two of the multiple axes.

Figure 2:
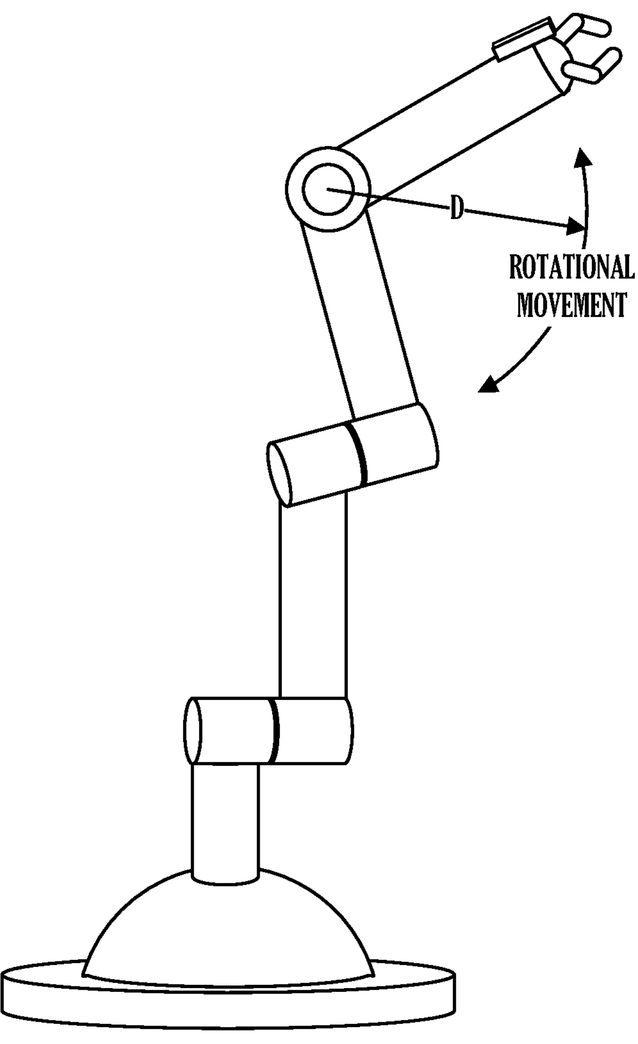
FIG. 2 is an example of rotational movement in a portion of a robot appendage, according to an embodiment.

FIG. 2 is an example of rotational movement in a portion of a robot appendage, according to an embodiment. FIG. 2 simply illustrates a periodic rotational movement of the rotating member and the distance D determined from the technique illustrated in FIG. 1 and described above.

Figure 3:
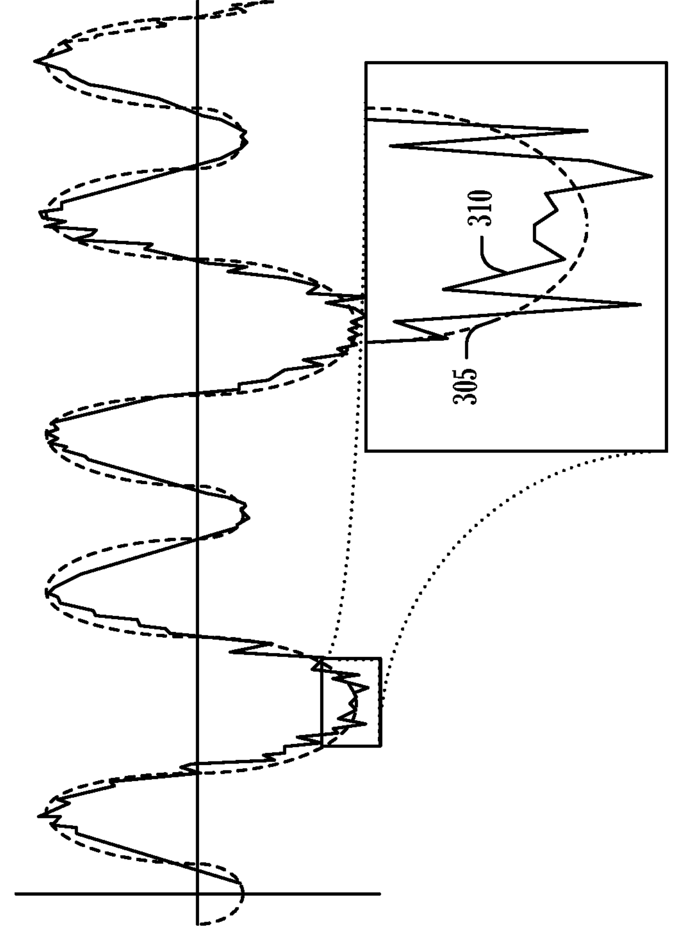
FIG. 3 is an example of fitting a modeled value to a measured value to determine a position of a tool on a robotic appendage, according to an embodiment.

FIG. 3 is an example of fitting a modeled value 305 to a measured value 310 to determine a position of a tool on a robotic appendage, according to an embodiment. The modeled value 305 of acceleration is illustrated as a dashed line and the measured value 310 of acceleration is a solid line. Below the x axis indicates deceleration. The illustrated acceleration pattern corresponds to a periodic rotation across an arc, the deeper troughs indicating when the rotating member switched directions at the ends of the arc. Changing directions may provide more acceleration features (e.g., speeding up, slowing down, stopping, etc.) to fit the measured value 310 to the modeled value 305.

The following provides some background on the techniques used to create the modeled acceleration and how the measured acceleration is fit to the modeled acceleration. Consider, a geometric algebra $G_n$ of the n dimensional space by $G_{p,q}$, where p,q stand for the number of basis vectors that square to 1 and −1 respectively and fulfill n=p+q. In this geometry the basis vectors $e_i$ to denote the vector basis i. In a Geometric algebra $G_{p,q}$, the Clifford product (*) of two basis vector is defined as:

$$e_i e_j = \begin{cases} 1 \text{ for } i = j \in 1, \dots, p \\ -1 \text{ for } i = j \in p+1, \dots, p+q \\ \_ij = e\_i \wedge e\_j \text{ for } i \neq j \end{cases}$$

This leads to a basis for the entire algebra:

$$\{1\},\{e_i\},\{e_i \wedge e_j\},\{e_i \wedge e_j \wedge e_k\}, \dots ,\{e_1 \wedge e_2 \wedge \dots \wedge e_n\}$$

Any multivector may be expressed in terms of these bases. In the n-dimensional (n-D) space there are multivectors of grade 0 (scalars), grade 1 (vectors), grade 2 (bivectors), grade 3 (trivectors), etc. . . . up to grade n. Any two such multivectors may be multiplied using the Clifford product.

In the geometry of $G_{4,1}$ Algebra, $e_1$, $e_2$ $e_3$ also are like "I, j, k" vectorial calculus (e.g., $G_{3,0}$), with the addition of time. $G_{4,1}$ may be used to represent conformal geometric algebra. Consider a basis:

$$+\begin{cases} e_1^2 = 1 \\ e_2^2 = 1 \\ e_3^2 = 1 \\ e_4^2 = 1 \\ e_5^2 = -1 \end{cases}$$

Expanding to 32 Dimensions, from the generated bases {1, $e_1$, $e_2$, $e_3$, $e_4$, $e_5$, $e_{12}$, $e_{13}$, $e_{23}$, $e_{14}$, $e_{24}$, $e_{34}$, $e_{15}$, $e_{25}$, $e_{35}$, $e_{45}$, . . . , $e_{12345}$}, $e_1$, $e_2$, $e_3$ are Euclidean, $e_1$, $e_2$, $e_3$, $e_4$ are Projective, $e_1$, $e_2$, $e_3$, $e_4$, $e_5$ are Conformal and all are scalars. Bivector bases $e_{12}$, $e_{13}$, $e_{23}$ are Quaternions, and $e_{12}$, $e_{13}$, $e_{23}$, $e_{14}$, $e_{24}$, $e_{34}$, $e_{15}$, $e_{25}$, $e_{35}$, $e_{45}$ are Dual-Quaternions. Base $e_{12345}$ is a pseudoscalar.

Differential Kinematics in $G_{4,1}$ may follow several elements. First, a periodic function $f$ (t) is applied at a selected joint $q_i$ (e.g., rotating member). This may be represented by:

$$q_i = f(t)$$

$$\dot{q}_j \forall j \neq i$$

Then, sensor data from appendage is read:

$$\dot{q}_e, \ddot{q}_e, a_x, a_y, a_z, w_x, w_y, w_z$$

And the forward and differential kinematics are solved. A rotation for a current axis is computed:

$$\varphi = \sin^{-1}\frac{\dot{q}_e}{\dot{q}}$$

Then, an estimate of the acceleration and amplitude is made:

$$\varphi_{axis}, d_{axis}$$

In more detail, the first operation of the forward kinematics of the tool in a robot articulation is given by equation (1):

$$x'_j = \prod_{i=1}^{j} M_i x_j \prod_{i=1}^{j} \tilde{M}_{j-i+1}$$

For the second operation, the differential kinematics describes the linear velocity v of a point x given by equation (2):

$$v = \dot{x}' = \sum_{1}^{n} x' \cdot L'_i \dot{q}_i$$

$$v = (x' \cdot L'_1 x' \cdot L'_2 x' \cdot L'_3 \dots \ x' \cdot L'_n) \begin{pmatrix} \dot{q}_1 \\ \dot{q}_2 \\ \dot{q}_3 \\ \vdots \\ \dot{q}_n \end{pmatrix}$$

Where $L_1$ represents the i-th axis of rotation. this equation may be written as:

$$v = J\dot{q}$$

$$J == (x' \cdot x' \cdot L'_2 x' \cdot L'_3 \dots x' \cdot L'_n)$$

Where $L'_i$ is the axis line, rotated by the following transformation:

$$L'_j = \prod_{i=1}^{j-1} M_i L_j \prod_{i=1}^{j} \tilde{M}_{j-i}$$

For the third operation, the linear acceleration a of the tool (e.g., end effector, camera, etc.) as function of the joint accelerations is computed as the derivative of the Jacobian J:

$$\alpha = \dot{J}\dot{q} + J\ddot{q}$$

Here $\dot{J}\dot{q}$ may be computed by:

$$\dot{J}\dot{q} = (\dot{q}_1 \dot{q}_2 \dot{q}_3 \dots \ \dot{q}_n)(\Pi + \psi) \begin{pmatrix} \dot{q}_1 \\ \dot{q}_2 \\ \dot{q}_3 \\ \vdots \\ \dot{q}_n \end{pmatrix}$$

where:

$$\Phi = x' \cdot \begin{pmatrix} L'_1 L'_1 & L'_1 L'_3 & \dots & L'_1 L'_n \\ L'_2 L'_1 & L'_2 L'_2 & \dots & L'_2 L'_n \\ L'_3 L'_1 & L'_3 L'_2 & \dots & L'_3 L'_n \\ \vdots & \vdots & \ddots & \vdots \\ L'_n L'_1 & L'_n L'_2 & \dots & L'_n L'_n \end{pmatrix}$$

-continued and:

$$\Psi=\frac{1}{2}x'\cdot\left[\begin{pmatrix}L_1'L_1' & 0 & \dots & 0\\ L_2'L_1' & L_2'L_2' & \dots & 0\\ \vdots & \vdots & \ddots & \vdots\\ L_n'L_1' & L_n'L_2' & \dots & L_n'L_n'\end{pmatrix}-\begin{pmatrix}L_1'L_1' & 0 & \dots & 0\\ L_1'L_2' & L_2'L_2' & \dots & 0\\ \vdots & \vdots & \ddots & \vdots\\ L_1'L_n' & L_2'L_n' & \dots & L_n'L_n'\end{pmatrix}\right]$$

Then the acceleration may be computed as equation (3):

$$\alpha=\dot{q}^T(\Phi+\Psi)q+\dot{J}\ddot{q}$$

The computed acceleration (modeled value 305) may then be compared with the measured acceleration (measured value 310). Solving for x from equation (2) produces the position of the tool.

When the kinematics model is implemented, an estimate of the tool position by comparing modeled acceleration with measured acceleration may be obtained with the following operations. These examples represent processing for a single axis of rotation. However, by successively apply the operations to each axis, the entire relationship between the tool and the robotic appendage may be ascertained.

First, a periodic motion in one of the joints is produced without moving, to the extent possible, the other joints. In an example, the process is repeated for each and every joint. Given a first joint $q_1$, a periodic motion is selected. The periodic motion may be, for example:

$$q=\frac{3\pi}{10}\cdot(1-\cos(0.7\pi t+\pi))$$

Using this equation to move the joint, the tool rotates following a circular trajectory around the center of the joint axis, going back and forward over a quarter of the circle representing a complete revolution or rotation about the axis. This motion is illustrated in FIG. 2.

The position coordinates of the tool may be modeled as result of the forward kinematics simulation, recreated by using the encoder information— produced by the hardware of the joint of the robotic appendage—of every joint. For example, in cartesian coordinates, the position of (x,z) coordinates are given by the following:

$$P_z=-d\sin(q)$$

$$p_x=d\cos(q)$$

where the y axis is a fixed value, for example, because the tool height is not affected by the current motion. The following equation of kinematics is a simplification of the general case given by equation (1)

$$x_j'=\prod_{i=1}^{j}M_i x_j\prod_{i=1}^{j}\tilde{M}_{j-i+1}\Rightarrow\begin{matrix}p_z=-d\sin(q)\\ p_x=d\cos(q)\end{matrix}$$

After computing the kinematics, the differential kinematic is computed to estimate the linear velocity of the tool using equation (2). In this example, where only joint $q_1$ is moved, equation (2), may be computed as follows:

$$v=(x'\cdot L_1'x'\cdot L_2'x'\cdot L_3'\dots\ x'\cdot L_n')\begin{pmatrix}\dot{q}_1\\ \dot{q}_2\\ \dot{q}_3\\ \vdots\\ \dot{q}_n\end{pmatrix}\Rightarrow$$

-continued $$v_z=-\frac{d(3(0.7)\pi^2)}{10}\cos(q)(\sin(0.7\pi t+\pi))$$
$$v_x=-\frac{d(3(0.7)\pi^2)}{10}\sin(q)(\sin(0.7\pi t+\pi))$$

Where d represents the unknown distance from the tool to the rotation axis.

Next, the acceleration is computed using equation (3). In this example of moving a single joint, the simplified model may be described as the following:

$$a=\dot{q}^T(\Phi+\Psi)q+\dot{J}\ddot{q}\Rightarrow\begin{matrix}a_x=d\sin(q)\dot{q}^2-d\cos(q)\ddot{q}\\ a_z=d\cos(q)\dot{q}^2-d\cos(q)\ddot{q}\end{matrix}$$

When the sensor (e.g., IMU) is perfectly aligned with the axis of rotation, stimulating $\dot{q}$ will return the measurement $\dot{q}$. However, in most cases, the sensor is not perfectly aligned and it may be useful to determine the orientation (e.g., pose) of the sensor with respect to the axis. This determination may be most meaningful on the support member of the tool. The following example is of a single angle computation on the axis of rotation. Again, axis by axis repetition of the following may be used to determine other angles. The following equation represents the original rotation velocity induced on the robot multiplied by h. Here, h is a scalar factor that is adjusted to minimize the error interpolating the measured value 310 (e.g., captured signal from the sensor):

$$\dot{q}_e=h\frac{3\pi^2}{10}\cdot(0.7)\cdot(\sin(0.7\pi t+\pi))$$

The equation $\dot{q}_e$ is generated by the misalignment of the sensor and the angle of rotation. The angle of the miss alignment is given by $$h=\sin(\varphi)$$

Accordingly, the angle of misalignment is computed by:

$$h=\sin^{-1}\left(\frac{\dot{q}_e}{\dot{q}}\right)$$

Setting h=0.04 with an estimated angle $\varphi=2.29°$, the orientation in the sensor will produce a constant component induced by the gravity in the x-axis, this offset following:

$$\alpha_{gx}=gh=g\sin(\varphi)$$

Resulting in the following given our values:

$$a_{gx}=0.04*\frac{9.81m}{s^2}=\frac{0.39m}{s^2}$$

Because the sensor is rotating due to the introduced stimulation (e.g., rotational movement), the accelerations computed for each axis may be mapped to the sensor axis and the offset introduced by the gravity may be incorporated with the following:

$$\alpha_x=d\sin(q)\dot{q}^2-d\cos(q)\ddot{q}+a_{gx}$$

$$\alpha z=d\cos(q)\dot{q}^2+d\sin(q)\ddot{q}+\alpha_{gz}$$

Accordingly, the estimated acceleration on the rotated x axis is given by:

$$\alpha'_x=(\alpha_x \cos(q)-\alpha_z \sin(q))$$

To finish the process, the measured value 310 (e.g., information from the accelerometer of the IMU) is compared with the modeled value 305. Although the measured value 310 may be noisy, it will generally track the modeled value 305 as illustrated in FIG. 3, enabling minimization of fit error between the two to find the distance from the tool to the rotation axis. Again, by moving a rotating member, an estimated D of the distance to this axis is created. The process may be repeated for each axis to get a more accurate result for all the axes by intersecting circular trajectories generated by every movement.

Figure 4:
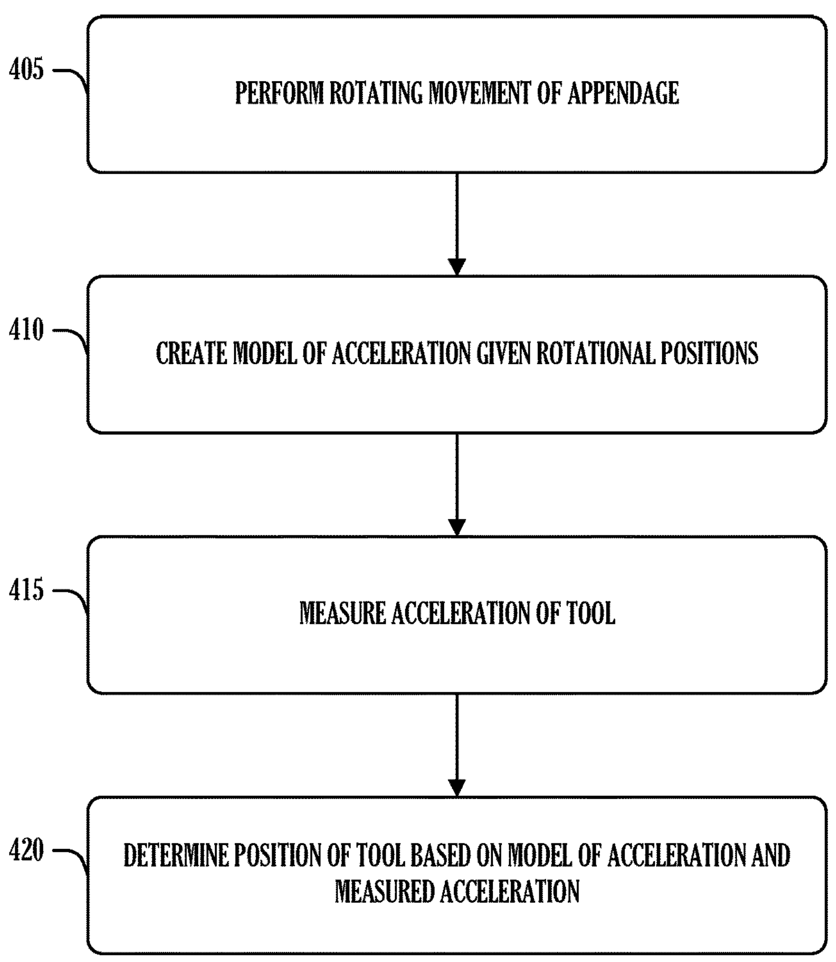
FIG. 4 illustrates a flow diagram of an example of a method for tool position determination in a robotic appendage, according to an embodiment.

FIG. 4 illustrates a flow diagram of an example of a method 400 for tool position determination in a robotic appendage, according to an embodiment. The operations of the method 400 are performed by computer hardware, such as that described above or below (e.g., processing circuitry).

At operation 405, a rotational movement of a portion of the robotic appendage is performed. Here, the rotational movement is defined by rotational positions about an axis. In an example, the robotic appendage includes multiple portions. In an example, each portion of the multiple portions is defined by a rotating member and a support member.

In an example, the rotational positions cover less than a complete revolution about the axis. In an example, the rotational positions cover a quarter or a third of the complete revolution about the axis. In an example, the rotational movement repeats the rotational positions multiple times. In an example, the repetition of the rotational positions is divided into equal time periods.

In an example, multiple portions other than the portion are placed into a predefined position for the acceleration measurement from the sensor affixed to the tool. In an example, additional respective rotational movements are performed for the multiple portions to determine a distance between the tool and respective rotating members of the multiple portions. In an example, the additional rotational movements are performed for every one of the multiple portions.

At operation 410, a model of tool acceleration for a tool along the rotational movement is created. In an example, the tool is a camera. In an example, the tool is a manipulator. In an example, creating the model of the tool acceleration includes creating a kinematic model of tool positioning based on the rotational movement. In an example, creating the model of the tool acceleration includes deriving tool acceleration from the kinematic model to create a differential kinematic model of tool acceleration.

At operation 415, acceleration measurements from a sensor affixed to the tool are obtained (e.g., received or retrieved). Here, the acceleration measurements are taken during the rotational movement. In an example, the acceleration measurements include acceleration in multiple axes.

At operation 420, a distance from the axis to the tool is determined based on the model of tool acceleration and the acceleration measurements. In an example, determining the distance from the axis to the tool based on the model of tool acceleration and the acceleration measurements includes minimizing error between the acceleration measurements and the model of tool acceleration. In an example, an orientation of the tool with respect to the portion of the robotic appendage is determined based on the model of tool acceleration and the acceleration measurements. In an example, where the acceleration measurements include acceleration in multiple axes, the orientation of the tool is determined based on apportionment of tool acceleration between at least two of the multiple axes.

Figure 5:
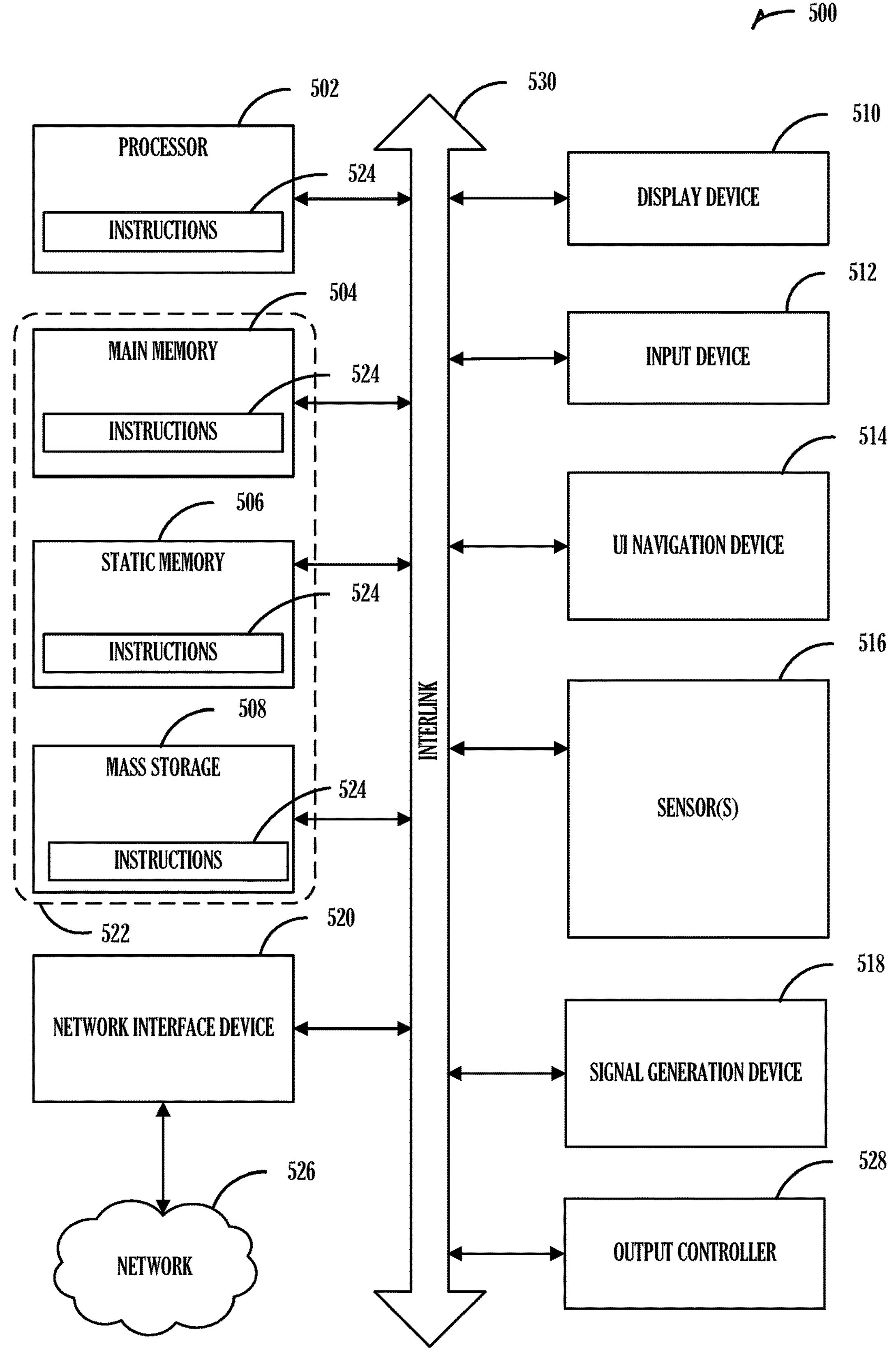
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drives, tape drives, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 522 may be representative of the instructions 524, such as instructions 524 themselves or a format from which the instructions 524 may be derived. This format from which the instructions 524 may be derived may include source code, encoded instructions (e.g., in compressed or encrypted form), packaged instructions (e.g., split into multiple packages), or the like. The information representative of the instructions 524 in the machine readable medium 522 may be processed by processing circuitry into the instructions to implement any of the operations discussed herein. For example, deriving the instructions 524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 524.

In an example, the derivation of the instructions 524 may include assembly, compilation, or interpretation of the information (e.g., by the processing circuitry) to create the instructions 524 from some intermediate or preprocessed format provided by the machine readable medium 522. The information, when provided in multiple parts, may be combined, unpacked, and modified to create the instructions 524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

ADDITIONAL NOTES & EXAMPLES

Example 1 is a device for tool position determination in a robotic appendage, the device comprising: an interface configured to communicate with a robotic appendage; processing circuitry that, when in operation, is configured to: communicate an instruction, via the interface, to perform a rotational movement of a portion of the robotic appendage, the rotational movement defined by rotational positions about an axis; create a model of tool acceleration for a tool along the rotational movement, the tool affixed to the robotic appendage; obtain acceleration measurements from a sensor affixed to the tool, the acceleration measurements taken during the rotational movement; and provide a distance from the axis to the tool based on the model of tool acceleration and the acceleration measurements.

In Example 2, the subject matter of Example 1, wherein the rotational positions are less than a complete revolution about the axis.

In Example 3, the subject matter of Example 2, wherein the rotational positions are a quarter or a third of the complete revolution about the axis.

In Example 4, the subject matter of any of Examples 2-3, wherein the rotational movement repeats the rotational positions multiple times.

In Example 5, the subject matter of Example 4, wherein repetition of the rotational positions is divided into equal time periods.

In Example 6, the subject matter of any of Examples 1-5, wherein the robotic appendage includes multiple portions, wherein each portion of the multiple portions is defined by a rotating member and a support member.

In Example 7, the subject matter of any of Examples 1-6, wherein multiple portions other than the portion are placed into a predefined position for the acceleration measurements from the sensor affixed to the tool.

In Example 8, the subject matter of any of Examples 6-7, wherein additional respective rotational movements are performed for the multiple portions to determine a distance between the tool and respective rotating members of the multiple portions.

In Example 9, the subject matter of Example 8, wherein the additional respective rotational movements are performed for every one of the multiple portions.

In Example 10, the subject matter of any of Examples 1-9, wherein the processing circuitry is configured to determine an orientation of the tool with respect to the portion of the robotic appendage based on the model of tool acceleration and the acceleration measurements.

In Example 11, the subject matter of Example 10, wherein the acceleration measurements include acceleration in multiple axes, and wherein the orientation of the tool is determined based on apportionment of tool acceleration between at least two of the multiple axes.

In Example 12, the subject matter of any of Examples 1-11, wherein the tool is a camera.

In Example 13, the subject matter of any of Examples 1-12, wherein the tool is a manipulator.

In Example 14, the subject matter of any of Examples 1-13, wherein, to create the model of the tool acceleration, the processing circuitry is configured to create a kinematic model of tool positioning based on the rotational movement.

In Example 15, the subject matter of Example 14, wherein, to create the model of the tool acceleration, the processing circuitry is configured to derive tool acceleration from the kinematic model to create a differential kinematic model of tool acceleration.

In Example 16, the subject matter of any of Examples 1-15, wherein, to provide the distance from the axis to the tool based on the model of tool acceleration and the acceleration measurements, the processing circuitry is configured to minimize error between the acceleration measurements and the model of tool acceleration to determine the distance.

Example 17 is a method for tool position determination in a robotic appendage, the method comprising: communicating an instruction to perform a rotational movement of a portion of the robotic appendage, the rotational movement defined by rotational positions about an axis; creating a model of tool acceleration for a tool along the rotational movement, the tool affixed to the robotic appendage; obtaining acceleration measurements from a sensor affixed to the tool, the acceleration measurements taken during the rotational movement; and providing a distance from the axis to the tool based on the model of tool acceleration and the acceleration measurements.

In Example 18, the subject matter of Example 17, wherein the rotational positions are less than a complete revolution about the axis.

In Example 19, the subject matter of Example 18, wherein the rotational positions are a quarter or a third of the complete revolution about the axis.

In Example 20, the subject matter of any of Examples 18-19, wherein the rotational movement repeats the rotational positions multiple times.

In Example 21, the subject matter of Example 20, wherein repetition of the rotational positions is divided into equal time periods.

In Example 22, the subject matter of any of Examples 17-21, wherein the robotic appendage includes multiple portions, wherein each portion of the multiple portions is defined by a rotating member and a support member.

In Example 23, the subject matter of any of Examples 17-22, wherein multiple portions other than the portion are placed into a predefined position for the acceleration measurements from the sensor affixed to the tool.

In Example 24, the subject matter of any of Examples 22-23, wherein additional respective rotational movements are performed for the multiple portions to determine a distance between the tool and respective rotating members of the multiple portions.

In Example 25, the subject matter of Example 24, wherein the additional respective rotational movements are performed for every one of the multiple portions.

In Example 26, the subject matter of any of Examples 17-25, comprising determining an orientation of the tool with respect to the portion of the robotic appendage based on the model of tool acceleration and the acceleration measurements.

In Example 27, the subject matter of Example 26, wherein the acceleration measurements include acceleration in multiple axes, and wherein the orientation of the tool is determined based on apportionment of tool acceleration between at least two of the multiple axes.

In Example 28, the subject matter of any of Examples 17-27, wherein the tool is a camera.

In Example 29, the subject matter of any of Examples 17-28, wherein the tool is a manipulator.

In Example 30, the subject matter of any of Examples 17-29, wherein creating the model of the tool acceleration includes creating a kinematic model of tool positioning based on the rotational movement.

In Example 31, the subject matter of Example 30, wherein creating the model of the tool acceleration includes deriving tool acceleration from the kinematic model to create a differential kinematic model of tool acceleration.

In Example 32, the subject matter of any of Examples 17-31, wherein providing the distance from the axis to the tool based on the model of tool acceleration and the acceleration measurements includes minimizing error between the acceleration measurements and the model of tool acceleration to determine the distance.

Example 33 is at least one machine readable medium including instructions for tool position determination in a robotic appendage, the instructions, when executed by processing circuitry, cause the processing circuitry to perform operations comprising: communicating an instruction to perform a rotational movement of a portion of the robotic appendage, the rotational movement defined by rotational positions about an axis; creating a model of tool acceleration for a tool along the rotational movement, the tool affixed to the robotic appendage; obtaining acceleration measurements from a sensor affixed to the tool, the acceleration measurements taken during the rotational movement; and providing a distance from the axis to the tool based on the model of tool acceleration and the acceleration measurements.

In Example 34, the subject matter of Example 33, wherein the rotational positions are less than a complete revolution about the axis.

In Example 35, the subject matter of Example 34, wherein the rotational positions are a quarter or a third of the complete revolution about the axis.

In Example 36, the subject matter of any of Examples 34-35, wherein the rotational movement repeats the rotational positions multiple times.

In Example 37, the subject matter of Example 36, wherein repetition of the rotational positions is divided into equal time periods.

In Example 38, the subject matter of any of Examples 33-37, wherein the robotic appendage includes multiple portions, wherein each portion of the multiple portions is defined by a rotating member and a support member.

In Example 39, the subject matter of any of Examples 33-38, wherein multiple portions other than the portion are placed into a predefined position for the acceleration measurements from the sensor affixed to the tool.

In Example 40, the subject matter of any of Examples 38-39, wherein additional respective rotational movements are performed for the multiple portions to determine a distance between the tool and respective rotating members of the multiple portions.

In Example 41, the subject matter of Example 40, wherein the additional respective rotational movements are performed for every one of the multiple portions.

In Example 42, the subject matter of any of Examples 33-41, wherein the operations comprise determining an orientation of the tool with respect to the portion of the robotic appendage based on the model of tool acceleration and the acceleration measurements.

In Example 43, the subject matter of Example 42, wherein the acceleration measurements include acceleration in multiple axes, and wherein the orientation of the tool is determined based on apportionment of tool acceleration between at least two of the multiple axes.

In Example 44, the subject matter of any of Examples 33-43, wherein the tool is a camera.

In Example 45, the subject matter of any of Examples 33-44, wherein the tool is a manipulator.

In Example 46, the subject matter of any of Examples 33-45, wherein creating the model of the tool acceleration includes creating a kinematic model of tool positioning based on the rotational movement.

In Example 47, the subject matter of Example 46, wherein creating the model of the tool acceleration includes deriving tool acceleration from the kinematic model to create a differential kinematic model of tool acceleration.

In Example 48, the subject matter of any of Examples 33-47, wherein providing the distance from the axis to the tool based on the model of tool acceleration and the acceleration measurements includes minimizing error between the acceleration measurements and the model of tool acceleration to determine the distance.

Example 49 is a system for tool position determination in a robotic appendage, the system comprising: means for communicating an instruction to perform a rotational movement of a portion of the robotic appendage, the rotational movement defined by rotational positions about an axis; means for creating a model of tool acceleration for a tool along the rotational movement, the tool affixed to the robotic appendage; means for obtaining acceleration measurements from a sensor affixed to the tool, the acceleration measurements taken during the rotational movement; and means for providing a distance from the axis to the tool based on the model of tool acceleration and the acceleration measurements.

In Example 50, the subject matter of Example 49, wherein the rotational positions are less than a complete revolution about the axis.

In Example 51, the subject matter of Example 50, wherein the rotational positions are a quarter or a third of the complete revolution about the axis.

In Example 52, the subject matter of any of Examples 50-51, wherein the rotational movement repeats the rotational positions multiple times.

In Example 53, the subject matter of Example 52, wherein repetition of the rotational positions is divided into equal time periods.

In Example 54, the subject matter of any of Examples 49-53, wherein the robotic appendage includes multiple portions, wherein each portion of the multiple portions is defined by a rotating member and a support member.

In Example 55, the subject matter of any of Examples 49-54, wherein multiple portions other than the portion are placed into a predefined position for the acceleration measurements from the sensor affixed to the tool.

In Example 56, the subject matter of any of Examples 54-55, wherein additional respective rotational movements are performed for the multiple portions to determine a distance between the tool and respective rotating members of the multiple portions.

In Example 57, the subject matter of Example 56, wherein the additional respective rotational movements are performed for every one of the multiple portions.

In Example 58, the subject matter of any of Examples 49-57, comprising means for determining an orientation of the tool with respect to the portion of the robotic appendage based on the model of tool acceleration and the acceleration measurements.

In Example 59, the subject matter of Example 58, wherein the acceleration measurements include acceleration in multiple axes, and wherein the orientation of the tool is determined based on apportionment of tool acceleration between at least two of the multiple axes.

In Example 60, the subject matter of any of Examples 49-59, wherein the tool is a camera.

In Example 61, the subject matter of any of Examples 49-60, wherein the tool is a manipulator.

In Example 62, the subject matter of any of Examples 49-61, wherein the means for creating the model of the tool acceleration include means for creating a kinematic model of tool positioning based on the rotational movement.

In Example 63, the subject matter of Example 62, wherein the means for creating the model of the tool acceleration include means for deriving tool acceleration from the kinematic model to create a differential kinematic model of tool acceleration.

In Example 64, the subject matter of any of Examples 49-63, wherein the means for providing the distance from the axis to the tool based on the model of tool acceleration and the acceleration measurements include means for minimizing error between the acceleration measurements and the model of tool acceleration to determine the distance.

Example 65 is at least one machine-readable medium including instructions that, when executed by processing circuitry, cause the processing circuitry to perform operations to implement of any of Examples 1-64.

Example 66 is an apparatus comprising means to implement of any of Examples 1-64.

Example 67 is a system to implement of any of Examples 1-64.

Example 68 is a method to implement of any of Examples 1-64.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A device for determining a position of a tool affixed to a robotic appendage, the device comprising:
- an interface configured to communicate with the robotic appendage;
- processing circuitry configured to:
  - communicate an instruction, via the interface, to perform a rotational movement of a portion of the robotic appendage to determine the position of the tool, the rotational movement being defined by rotational positions about an axis;
  - generate a model of tool acceleration for the tool along the rotational movement that predicts acceleration of the tool at a variety of distances from the axis;
  - obtain acceleration measurements from a sensor affixed to the tool, the acceleration measurements being taken during the rotational movement; and
  - fit the acceleration measurements to the model of tool acceleration to determine a distance from the axis to the tool.

2. The device of claim 1, wherein the rotational positions are less than a complete revolution about the axis.

3. The device of claim 1, wherein the rotational positions are a quarter or a third of a complete revolution about the axis.

4. The device of claim 1, wherein the rotational movement repeats the rotational positions multiple times.

5. The device of claim 1, wherein the robotic appendage includes multiple portions, and
- wherein each portion of the multiple portions is defined by a rotating member and a support member.

6. The device of claim 5, wherein additional rotational movements are respectively performed for the multiple portions to determine a distance between the tool and respective rotating member of the multiple portions.

7. The device of claim 1, wherein multiple portions of the robotic appendage other than the portion of the robotic appendage are placed into a predefined position as the acceleration measurements are obtained from the sensor affixed to the tool.

8. The device of claim 1, wherein the processing circuitry is configured to determine an orientation of the tool with respect to the portion of the robotic appendage based on the model of tool acceleration and the acceleration measurements.

9. The device of claim 8, wherein the acceleration measurements include acceleration in multiple axes, and
- wherein the orientation of the tool is determined based on a distribution of tool acceleration between at least two of the multiple axes.

10. The device of claim 1, wherein the processing circuitry is configured to generate the model of the tool acceleration by generating a kinematic model of tool positioning based on the rotational movement.

11. The device of claim 10, wherein the processing circuitry is configured to generate the model of the tool acceleration by deriving tool acceleration from the kinematic model to generate a differential kinematic model of tool acceleration.

12. The device of claim 1, wherein the processing circuitry is configured to determine the distance from the axis to the tool by minimizing an error between the acceleration measurements and the model of tool acceleration.

13. The device of claim 1, wherein the instruction comprises an instruction to perform the rotational movement of the portion of the robotic appendage to determine the position of the tool as part of a calibration operation, and wherein the distance from the axis to the tool is determined in accordance with the calibration operation.

14. The device of claim 1, wherein the model of tool acceleration is generated using differential kinematics in conformal geometric algebra to compute linear acceleration of the tool as a function of joint accelerations.

15. A non-transitory machine-readable medium including instructions for determining a position of a tool affixed to a robotic appendage, the instructions, when executed by processing circuitry, cause the processing circuitry to:

communicate an instruction to perform a rotational movement of a portion of the robotic appendage to determine the position of the tool, the rotational movement being defined by rotational positions about an axis;

generate a model of tool acceleration for the tool along the rotational movement that predicts acceleration of the tool at a variety of distances from the axis;

obtain acceleration measurements from a sensor affixed to the tool, the acceleration measurements being taken during the rotational movement; and fit the acceleration measurements to the model of tool acceleration to determine a distance from the axis to the tool.

16. The non-transitory machine-readable medium of claim 15, wherein the rotational positions are less than a complete revolution about the axis.

17. The non-transitory machine-readable medium of claim 15, wherein the rotational positions are a quarter or a third of a complete revolution about the axis.

18. The non-transitory machine-readable medium of claim 15, wherein the robotic appendage includes multiple portions, and wherein each portion of the multiple portions is defined by a rotating member and a support member.

19. The non-transitory machine-readable medium of claim 18, wherein additional rotational movements are respectively performed for the multiple portions to determine a distance between the tool and respective rotating member of the multiple portions.

20. The non-transitory machine-readable medium of claim 15, wherein multiple portions of the robotic appendage other than the portion of the robotic appendage are placed into a predefined position as the acceleration measurements are obtained from the sensor affixed to the tool.

21. The non-transitory machine-readable medium of claim 15, wherein an orientation of the tool with respect to the portion of the robotic appendage is determined based on the model of tool acceleration and the acceleration measurements.

22. The non-transitory machine-readable medium of claim 21, wherein the acceleration measurements include acceleration in multiple axes, and wherein the orientation of the tool is determined based on a distribution of tool acceleration between at least two of the multiple axes.

23. The non-transitory machine-readable medium of claim 15, wherein generating the model of the tool acceleration includes generating a kinematic model of tool positioning based on the rotational movement.

24. The non-transitory machine-readable medium of claim 23, wherein the model of the tool acceleration is generated by deriving tool acceleration from the kinematic model to generate a differential kinematic model of tool acceleration.

25. The non-transitory machine-readable medium of claim 15, wherein the distance from the axis to the tool is determined based on minimizing error between the acceleration measurements and the model of tool acceleration.

* * * * *